Dec. 5, 1939.  H. D. J. CANTONI  2,181,868

VALVE SEALING MEANS FOR ENGINES

Filed Jan. 19, 1938

Inventor:
Humbert Denis Jean Cantoni
By James C. Markle
his Attorney.

Patented Dec. 5, 1939

2,181,868

UNITED STATES PATENT OFFICE 2,181,868

VALVE SEALING MEANS FOR ENGINES

Humbert Denis Jean Cantoni, Paris, France

Application January 19, 1938, Serial No. 185,743
In France January 19, 1937

8 Claims. (Cl. 121—187)

The present invention relates to engines and has particular reference to the kind of engine in which a bank of radially or star arranged cylinders is mounted to have relative movement with respect to an encircling annular valve member and in which the valve member and the outer ends of the cylinders are provided with cooperating ports for flow of cylinder gases, which ports are sealed by sealing elements carried at the ported ends of the cylinders and in sliding contact with the ported face of the valve member.

Still more particularly the invention relates to engines of the above general type in which the sealing elements constitute annular members telescopically mounted at the outer ends of the cylinder structures so as to be capable of rotating with respect to the axes of their respectively associated cylinders, and having spherically curved end sealing surfaces in sliding contact with the spherically curved inner surface of the valve member.

In prior forms of construction the areas of contact surface between the valve member and the sealing elements have been symmetrical with respect to the plane passing through the centers of the several sealing elements and with this arrangement, sealing elements, while capable of turning about their own individual axis, frequently do not turn. As a result of this the sealing surfaces which are in sliding contact with the valve face are subject to scoring which tends to produce scores parallel to each other and in the plane of relative sliding movement between the contacting parts. Such scores may be caused by impurities in the lubricant or by momentary failure of the lubricating film at some local spot on the face of the valve member and once such scores are started, they may be deepened by the scoring action of high pressure gases from the cylinder. This action tends to rapidly increase the general wear of the parts and may in comparatively short time seriously impair or even destroy the effectiveness of the seal sought to be provided between the sliding parts.

The general object of the present invention is to improve upon prior constructions of this general kind by so forming and arranging the parts that are in sliding contact with each other that different and asymmetrically disposed areas of contact between the sliding sealing surfaces are provided, to thereby create a turning moment or torque due to friction and tending to cause each of the sealing elements to rotate about its own axis as it moves in sliding contact with the valve member.

The manner in which the above general object and other and more detailed objects of the invention may be attained may best be understood from a consideration of the ensuing portion of this specification, taken in conjunction with the accompanying drawing, in which a preferred embodiment of apparatus for carrying the invention into effect is described and illustrated by way of example.

In the drawing—

Advantageously, the turning moment or torque tending to rotate the sealing elements about their axes due to unbalanced frictional forces is obtained by relieving a portion or portions of the surface of the valve member with which the sealing elements are in contact, such relieved portion or portions being asymmetrically located with respect to the axes of rotation of the sealing elements. The areas represented by the openings of the valve ports in the valve member of course constitute relieved areas and the desired object of the invention is most advantageously secured by offsetting one or more of the port areas with respect to the plane passing through the axes of rotation of the sealing elements and this form of construction is illustrated by way of example although it is to be understood that the invention is not limited in its scope to the specific form of construction shown.

Figure 1:
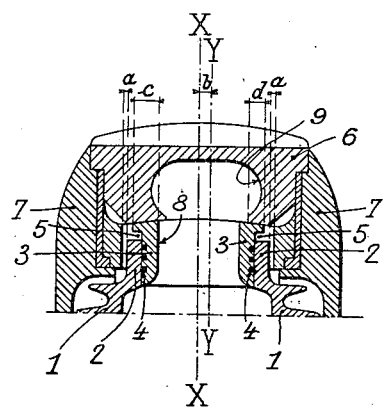
Fig. 1 is a section, on a plane passing through the axis of the crank-shaft, of the outer part of a cylinder and of the annular valve.
Figure 2:
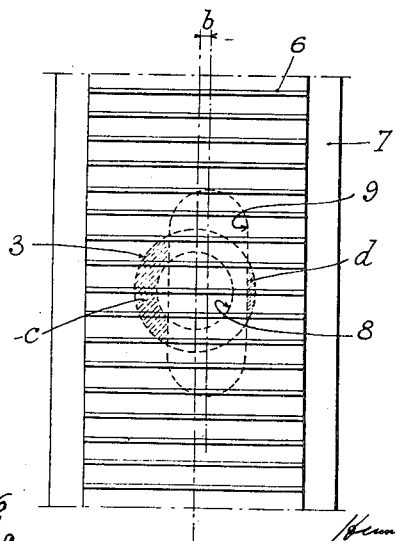
Fig. 2 is a plan view of the structure shown in Fig. 1.
Figure 3:
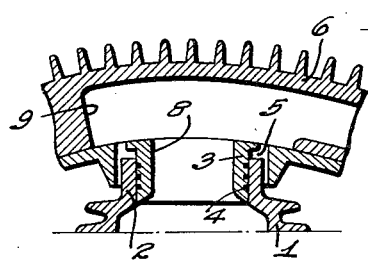
Fig. 3 is a section taken on the line X—X of Fig. 1.

Figs. 1 and 2 represent only a part of the engine, comprising an open ended cylinder body 1, terminating in a neck 2. In the bore provided by said neck there is disposed in telescopically sliding relation and in such manner as to be freely rotatable about an axis XX, an annular sealing element 3 which is provided with suitable packing rings 4 and which is pressed by a spring 5 against an annular valve member 6 which forms part of a fixed or rotatable casing 7 but which is in all cases given a relative rotation with reference to the cylinder 1.

The bore 8 of the sealing element 3 provides a port through which gases may be exhausted from the cylinder or admitted thereto, this port, in known manner, registering successively with inlet or exhaust ports in the annular valve member 6, one of which ports is shown at 9 in the drawing. In so far as the present invention is concerned it is immaterial whether the port 9 shown is an inlet port or an exhaust port.

As will be observed from Fig. 1, the port is offset so that its axis Y—Y is to one side of the axis X—X of rotation of the sealing element 3, which latter axis is advantageously coincident with the axis of the cylinder, by the distance b.

As will be observed from the drawing, the inner face of the valve member, with respect to which the sealing elements move in sliding contact, and the end surfaces of the sealing elements, which constitute sealing surfaces, are both spherically curved so as to permit the sealing elements to rotate about their own axes while maintaining constant surface contact with the inner face of the valve member.

With the port 9 offset as above described it will be apparent, from a consideration of Fig. 2, that as the sealing element and the port 9 pass each other due to the relative movement between the valve member and the cylinder, the areas c and d, constituting the contact surfaces on opposite sides of the port between the sealing element and the valve face, will be unequal. Consequently, the frictional force generated between the two relatively sliding surfaces over the area c, and tending to cause the sealing element to rotate in one direction about its axis will be larger than the similar but oppositely acting frictional force generated by contact of the smaller area d. The net result will be production of an unbalanced turning moment or torque applied to the sealing element as it passes the port and tending to cause it to rotate about its axis.

It will be evident that rotary movement of the sealing element about its axis may best be insured by frequent applications of torque to it due to unequally disposed contact areas and to this end the various ports distributed around the periphery of the valve member 6 may each advantageously be arranged in offset manner.

From the foregoing it will be evident that the invention may be carried out with specific structural embodiments differing from that hereinbefore described by way of example, and is to be understood as not limited to the specific arrangement illustrated but is to be understood as embracing all forms of structure falling within the scope of the appended claims.

Having now described my invention, what I claim as new and desire to secure by Letters Patent is:

1. In an engine, a valve member and a cylinder mounted to have relative movement with respect to each other, a sealing element mounted for rotation about its own axis at the outer end of the cylinder and having an end sealing surface in sliding contact with the face of said valve member, said valve face and said sealing surface being formed and arranged to provide unbalanced friction areas therebetween for causing rotation of the sealing element about its axis in at least one position of the cylinder relative to the valve member.

2. In an engine, a valve member and a cylinder mounted to have relative movement with respect to each other, a sealing element mounted for rotation about its own axis at the outer end of the cylinder and having an end sealing surface in sliding contact with the face of said valve member, said valve face being relieved in at least one place to provide unbalanced friction areas between it and said sealing surface for causing rotation of the sealing element about its axis at said place.

3. In an engine, a ported valve member and an open ended cylinder mounted to have relative movement with respect to each other, an annular sealing element mounted for rotation about its own axis at the outer end of the cylinder and having an end sealing surface in sliding contact with the face of the valve member in which the valve ports are located, at least one of said valve ports being located to one side of the center of said end sealing surface with respect to the plane of movement of the cylinder, whereby to cause contact between a larger area of the valve face and the sealing surface on one side of the center of the sealing element than between said face and said surface on the other side of said center as said sealing element and said port pass each other.

4. In an engine, an annular ported valve member having an inner sealing surface in which the valve ports are located, a radially arranged open ended cylinder located within said valve member, said cylinder and said valve member being mounted for relative rotation with respect to each other, and an annular sealing element mounted at the open end of the cylinder for rotation with respect to the cylinder axis and having an end sealing surface in sliding contact with the sealing surface of the valve member, said surfaces being formed and arranged to provide unbalanced friction areas therebetween for causing rotation of the sealing element about its axis in at least one position of rotation of the cylinder with respect to the valve member.

5. In an engine, an annular ported valve member having an inner sealing surface in which the valve ports are located, a radially arranged open ended cylinder located within said valve member, said cylinder and said valve member being mounted for relative rotation with respect to each other, and an annular sealing element mounted at the open end of the cylinder for rotation with respect to the cylinder axis and having an end sealing surface in sliding contact with the sealing surface of the valve member, the sealing surface on said valve member being relieved to provide a larger total area for contact with said end sealing surface on one side of the plane of relative rotation between the cylinder and the valve member and passing through the center of said end sealing surface than on the other side of said plane, whereby to cause said sealing element to rotate due to the difference in friction between said surfaces on the two sides of said plane.

6. In an engine, an annular ported valve member having an inner sealing surface in which the valve ports are located, a radially arranged open ended cylinder located within said valve member, said cylinder and said valve member being mounted for relative rotation with respect to each other, and an annular sealing element mounted at the open end of the cylinder for rotation with respect to the cylinder axis and having an end sealing surface in sliding contact with the sealing surface of the valve member, said valve ports being offset with respect to the plane of rotation passing through the center of said sealing element to provide greater contact area between said surfaces to one side of said plane than to the other side of said plane as the sealing element passes the ports.

7. In an engine, an annular ported valve member having a spherically curved inner sealing surface in which the valve ports are located, a cylinder mounted to have relative rotational movement within said valve member, the outer end of said cylinder being open, an annular sealing element telescopically mounted at the outer end of the cylinder for rotation with respect to the axis of the cylinder, said sealing element having a spherically curved end sealing surface in sliding contact with the inner surface of said valve member, and certain portions of the inner surface of said valve member being relieved to provide greater total contact area between said surfaces on one side of the plane of relative rotation between the cylinder and the valve member and passing through the center of said sealing element than on the other side of said plane.

8. In an engine, an annular ported valve member having a spherically curved inner sealing surface in which the valve ports are located, a cylinder mounted to have relative rotational movement within said valve member, the outer end of said cylinder being open, an annular sealing element telescopically mounted at the outer end of the cylinder for rotation with respect to the axis of the cylinder, said sealing element having a spherically curved end sealing surface in sliding contact with the inner surface of said valve member, said valve ports being offset with respect to the plane of relative rotation between the cylinder and the valve member and passing through the center of said sealing element to provide greater contact area between said surfaces on one side of said plane than on the other side of said plane as the sealing element and the ports pass each other.

HUMBERT DENIS JEAN CANTONI.